(12) United States Patent
     Watabe

(10) Patent No.: US 11,335,140 B2
(45) Date of Patent: May 17, 2022

(54) TERMINAL DEVICE AND COLLECTION METHOD

(71) Applicant: DENSO TEN Limited, Kobe (JP)

(72) Inventor: Hiroyuki Watabe, Kobe (JP)

(73) Assignee: DENSO TEN Limited, Kobe (JP)

( * ) Notice: Subject to any disclaimer, the term of this patent is extended or adjusted under 35 U.S.C. 154(b) by 174 days.

(21) Appl. No.: 16/619,220

(22) PCT Filed: May 8, 2019

(86) PCT No.: PCT/JP2019/018456
     § 371 (c)(1),
     (2) Date: Dec. 4, 2019

(87) PCT Pub. No.: WO2019/220987
     PCT Pub. Date: Nov. 21, 2019

(65) Prior Publication Data
     US 2020/0126328 A1    Apr. 23, 2020

(30) Foreign Application Priority Data
     May 14, 2018   (JP) .............................. JP2018-093263

(51) Int. Cl.
     *G07C 5/08*    (2006.01)
     *B60R 1/00*    (2022.01)
     *G06T 7/73*    (2017.01)
     *G07C 5/00*    (2006.01)
     *B60R 21/00*   (2006.01)
     (Continued)

(52) U.S. Cl.
     CPC .............. *G07C 5/0825* (2013.01); *B60R 1/00* (2013.01); *G06T 7/74* (2017.01); *G07C 5/008* (2013.01); *B60R 2021/0027* (2013.01)

(58) Field of Classification Search
     USPC ....................................................... 701/32.2
     See application file for complete search history.

(56) References Cited

U.S. PATENT DOCUMENTS 10,395,332 B1 *  8/2019  Konrardy .......... G06F 16/90335
10,698,421 B1 *  6/2020  Harris ..................... H04W 4/40
                         (Continued)

FOREIGN PATENT DOCUMENTS

JP    2006-084461 A    3/2006
JP    2010-233161 A   10/2010
                      (Continued)

OTHER PUBLICATIONS

Jul. 9, 2019 International Search Report issued in International Patent Application No. PCT/JP2019/018456.

*Primary Examiner* — Tyler D Paige
(74) *Attorney, Agent, or Firm* — Oliff PLC

(57) ABSTRACT

A terminal device according to one aspect of an embodiment includes a storage, an acquisition unit, a selection unit, and a transmitting unit. The storage stores therein imaging data captured from a moving body. The acquisition unit acquires a transmitting request for imaging data transmitted from an external device on the basis of positional information on the moving body. The selection unit selects, from among the imaging data stored in the storage, target data that is imaging data corresponding to the transmitting request acquired by the acquisition unit. The transmitting unit transmits the target data selected by the selection unit.

4 Claims, 7 Drawing Sheets

(51) Int. Cl.
  *G08G 1/00*    (2006.01)
  *G08G 1/13*    (2006.01)

(56) References Cited

U.S. PATENT DOCUMENTS

| | | | |
|---|---|---|---|
| 2004/0111301 A1* | 6/2004 | Wahlbin | G06Q 10/10 |
| | | | 705/4 |
| 2009/0051510 A1* | 2/2009 | Follmer | G07C 5/0808 |
| | | | 340/425.5 |
| 2017/0017734 A1* | 1/2017 | Groh | G06F 30/20 |
| 2019/0180118 A1* | 6/2019 | Kraeling | G01P 3/68 |
| 2019/0291726 A1* | 9/2019 | Shalev-Shwartz | |
| | | | B60W 40/105 |
| 2020/0001865 A1* | 1/2020 | Stobbe | G06K 9/00496 |
| 2020/0309541 A1* | 10/2020 | Lavy | G06K 9/6256 |

FOREIGN PATENT DOCUMENTS

| | | |
|---|---|---|
| JP | 2012-046129 A | 3/2012 |
| JP | 2013-134590 A | 7/2013 |
| JP | 2015-219531 A | 12/2015 |
| JP | 2015-230579 A | 12/2015 |
| JP | 6104482 B1 | 3/2017 |
| JP | 2017-069917 A | 4/2017 |
| JP | 2017-216581 A | 12/2017 |
| JP | 2018-133055 A | 8/2018 |
| WO | 2018/008122 A1 | 1/2018 |

* cited by examiner

| VEHICLE ID | POSITIONAL INFORMATION | CAMERA POSITION | BEHAVIOR INFORMATION | · · · · |
|---|---|---|---|---|
| A001 | NORTH LATITUDE: x, EAST LONGITUDE: y | FRONT AND REAR | · · · · · · · · | · · · · |
| A002 | NORTH LATITUDE: z, EAST LONGITUDE: x | FRONT, REAR, LEFT, AND RIGHT | · · · · · · · · | · · · · |
| A003 | NORTH LATITUDE: y, EAST LONGITUDE: y | ABSENT | · · · · · · · · | · · · · |
| | | | | |

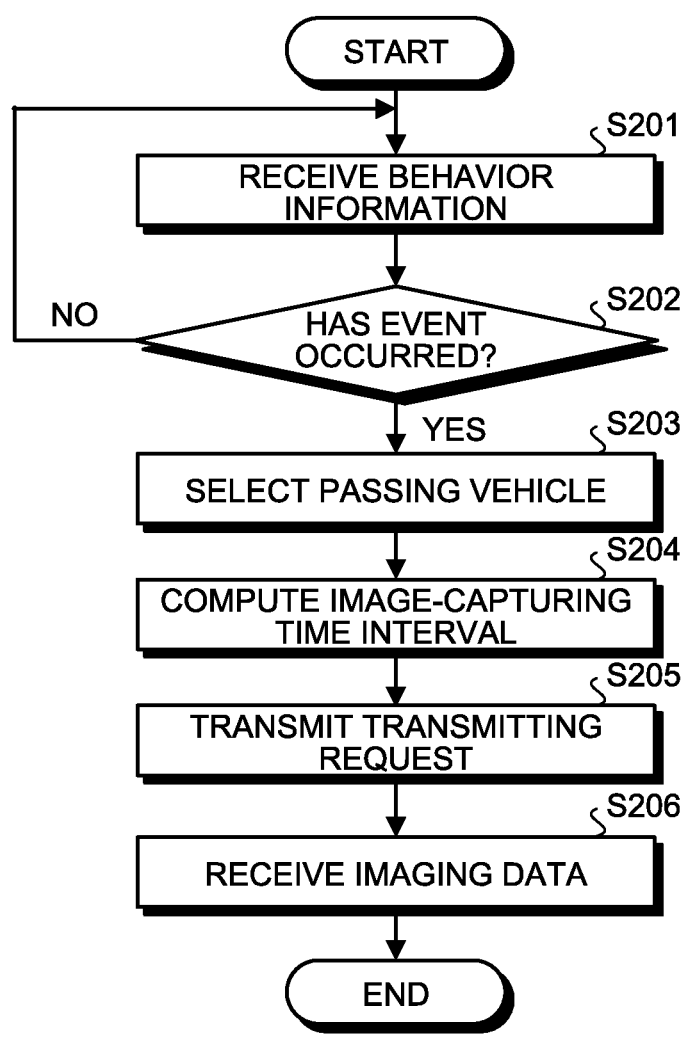

TERMINAL DEVICE AND COLLECTION METHOD

CROSS-REFERENCE TO RELATED APPLICATIONS

This application is national stage application of International Application No. PCT/JP2019/018456, filed on May 8, 2019, which designates the United States, incorporated herein by reference, and which claims the benefit of priority from Japanese Patent Application No. 2018-093263, filed on May 14, 2018, the entire contents of which are incorporated herein by reference.

FIELD

The embodiment discussed herein is directed to a terminal device and a collection method.

BACKGROUND

Conventionally, for example, there has been known a collection device that collects, when a traffic accident has occurred, imaging data on an accident scene captured by a camera provided in a vehicle having had the traffic accident and/or captured by cameras provided in vehicles around the accident scene. The imaging data collected by such a collection device is used in, for example, elucidating a cause of the accident (see Patent Literature 1, for example).

CITATION LIST

Patent Literature

Patent Literature 1: Japanese Patent No. 6104482

SUMMARY

Technical Problem

However, in the conventional technology, there presents possibility that communication amount needed for transmitting and receiving imaging data becomes large because all of imaging data, captured before and after an occurrence time point of the accident, are received.

Solution to Problem

A terminal device according to an embodiment includes a storage that stores therein imaging data captured from a moving body; an acquisition unit that acquires a transmitting request for imaging data transmitted from an external device; a selection unit that selects, from among the imaging data stored in the storage, target data that is imaging data corresponding to the transmitting request acquired by the acquisition unit; and a transmitting unit that transmits the target data selected by the selection unit.

BRIEF DESCRIPTION OF DRAWINGS

FIG. 9 is a flowchart illustrating a processing procedure to be executed by a collection device.

DESCRIPTION OF EMBODIMENTS

Hereinafter, an embodiment of a terminal device and a collection method according to the present disclosure will be described in detail with reference to the accompanying drawings. The present disclosure is not limited to the embodiment described in the following. Hereinafter, a case will be explained in which a moving body is a vehicle; however, the moving body may be, not limited to a vehicle, a moving body other than a vehicle, such as a ship and an airplane.

Figure 1:
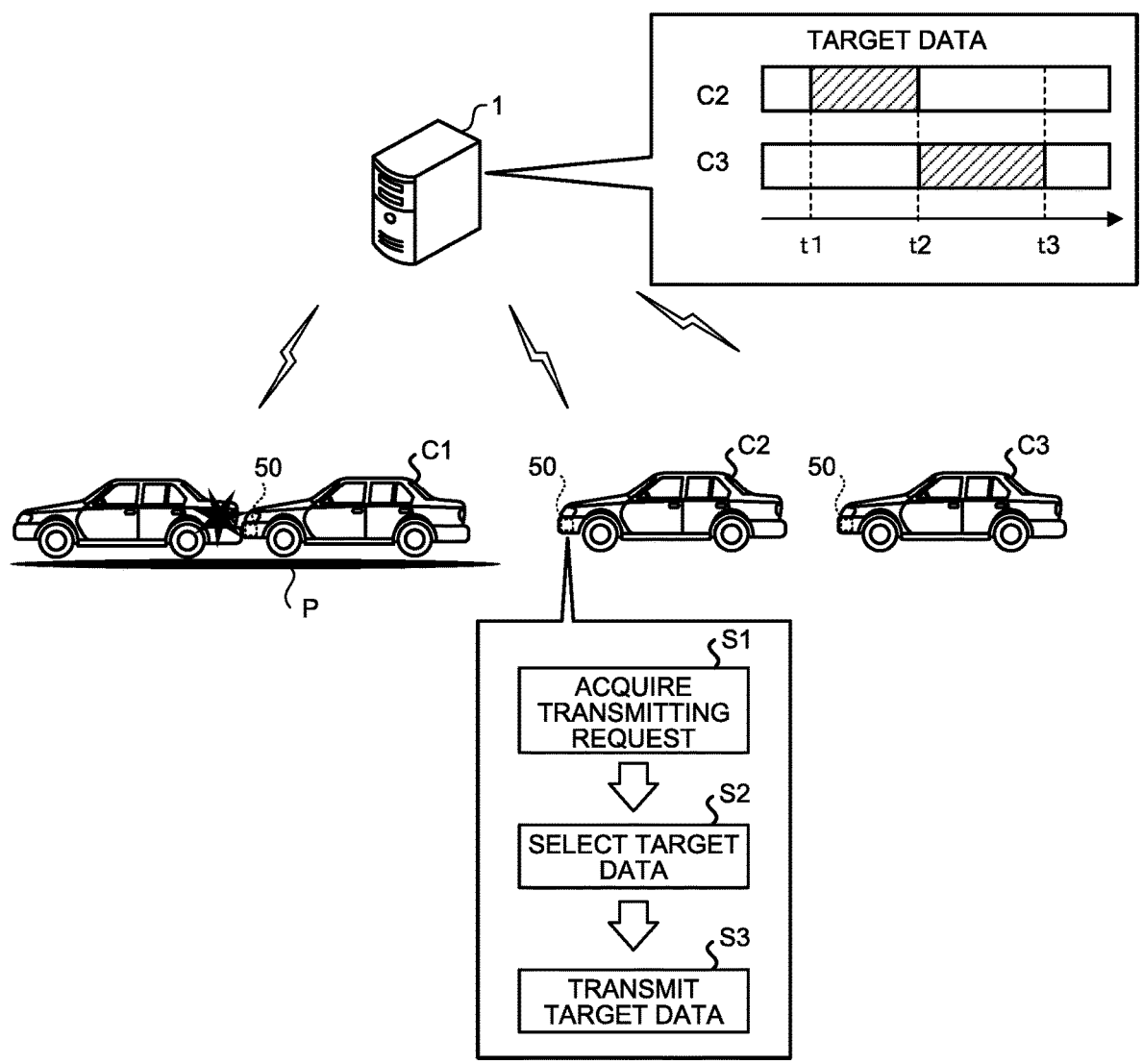
FIG. 1 is a diagram illustrating the outline of a collection method.

First, the outline of a collection method according to the embodiment will be explained with reference to FIG. 1. FIG. 1 is a diagram illustrating the outline of the collection method. A collection device 1 and terminal devices 50, which are illustrated in FIG. 1, transmit and receive data therebetween to execute the collection method.

The collection device 1 is a server device that collects, from the terminal devices 50 provided in vehicles C, imaging data obtained by capturing an event based on a behavior of a vehicle, such as an accident. The imaging data are used in, for example, elucidating a cause of the accident.

Conventionally, there has been known a collection device that collects imaging data from vehicles around an accident scene when an accident has occurred. Such a collection device uniformly collects all of imaging data from the surrounding vehicles.

Thus, in the conventional technology, even imaging data having substantially no relation to the accident are to be collected, thereby leading to increase in data amount needed for transmitting and receiving the imaging data.

Thus, in the collection method according to the embodiment, the collection device 1 collects only imaging data having relation to an accident so as to reduce data amount needed for transmitting and receiving imaging data.

Specifically, as illustrated in FIG. 1, in the collection method according to the embodiment, the terminal devices 50 first acquire a transmitting request for imaging data, which is transmitted from the collection device 1 (Step S1). For example, the collection device 1 acquires position information of each of the vehicles C at any time.

When an event, such as a traffic accident, has occurred, the collection device 1 transmits, to each of the terminal devices 50, a transmitting request for imaging data on the traffic accident. The transmitting request includes, for example, positional information on an occurrence point P and the like. The occurrence point P is one example of an image-capturing point.

Next, in the collection method according to the embodiment, the terminal device 50 selects, from among imaging data stored in a storage of the terminal device 50, target data being imaging data corresponding to the transmitting request (Step S2).

In the example illustrated in FIG. 1, a case is illustrated in which a vehicle C1 has collided with a preceding vehicle, and imaging data on the occurrence point P, which is a position where the vehicle C1 has collided, is to be collected.

There presents possibility that a vehicle C2 and a vehicle C3, which are travelling near the occurrence point P, capture an accident scene. Thus, the collection device 1 requests the vehicles C2 and C3 to transmit imaging data.

In other words, on the basis of positional information on the vehicle C2 and C3, the collection device 1 specifies, from among captured data already collected by the terminal devices 50, necessary imaging data, and transmits a transmitting request to a vehicle that has captured an occurrence scene of the accident or a vehicle that has possibility of having captured the occurrence scene of the accident.

Thus, the terminal device 50 is capable of selecting, as target data, imaging data that is based on the transmitting request. In the collection method according to the embodiment, the terminal device(s) 50 transmits target data to the collection device 1 (Step S3).

As described above, in the collection method according to the embodiment, the terminal device 50 selects, on the basis of a transmitting request, already-recorded target data, and further transmits the selected target data to the collection device 1.

Therefore, by employing the collection method according to the embodiment, it is possible to reduce communication amount while collecting necessary imaging data.

In the above-mentioned example, the case has been explained in which an event is a traffic accident; however, the event may be a sudden stop, a sudden steering, traffic jam, or the like. For example, in the collection method according to the embodiment, when detecting an accident as an event, it is possible to detect an occurrence of the event on the basis of a sensor value of a G sensor, an operation situation of an airbag, and the like.

Furthermore, it is needless to say that an event is able to be detected on the basis of accident information or traffic information separately transmitted from an external server.

The collection device 1 may select, not limited to the occurrence point P of an event, an arbitrary position as an image-capturing point. Moreover, the terminal device 50 may select imaging data on the basis of a selection condition transmitted from the collection device 1 by broadcast communication; this point will be mentioned later.

Figure 2:
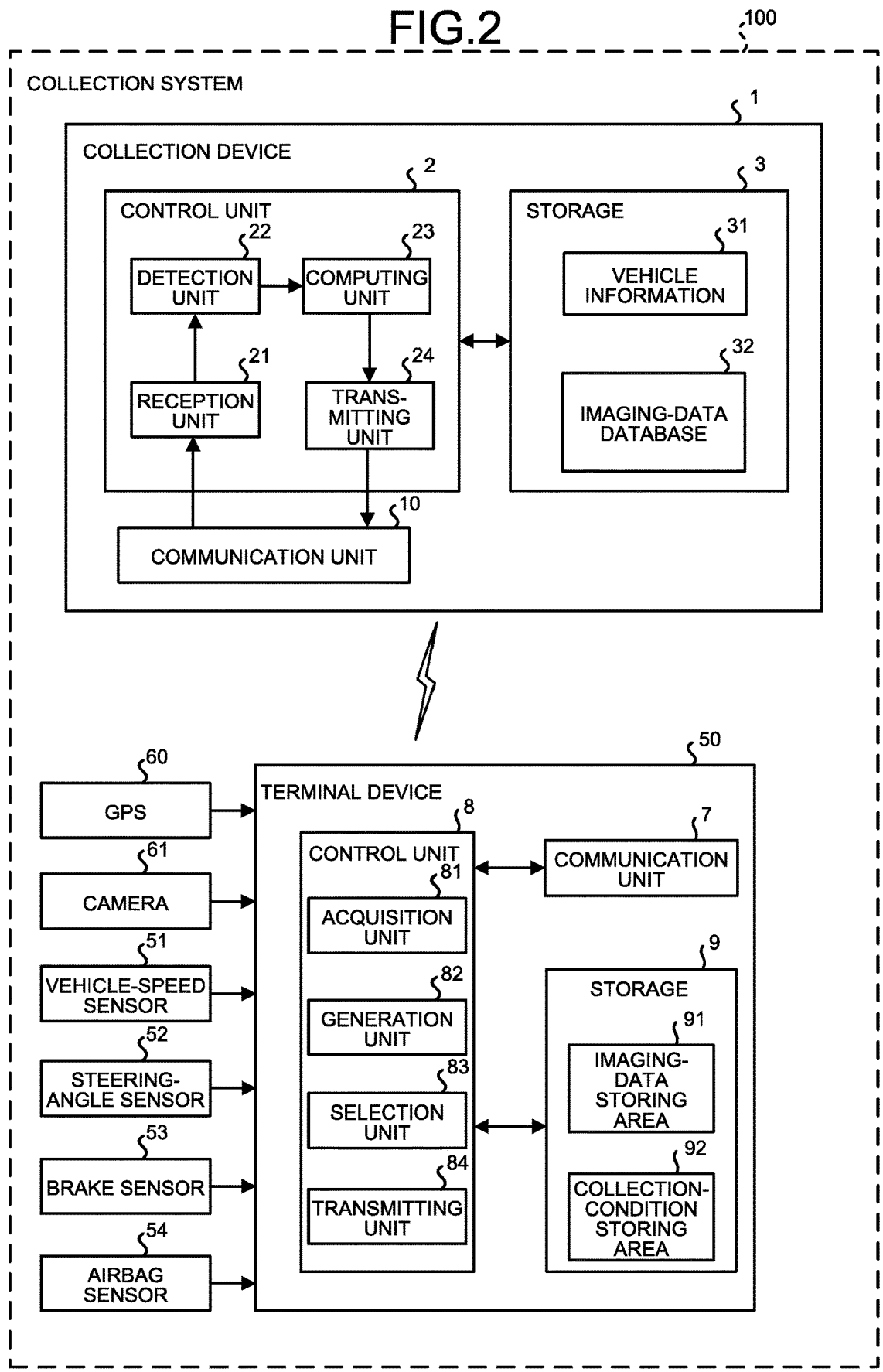
FIG. 2 is a block diagram illustrating a collection system.

Subsequently, a configuration example of a collection system 100 according to the embodiment will be explained with reference to FIG. 2. FIG. 2 is a block diagram illustrating the collection system 100. As illustrated in FIG. 2, the collection system 100 includes the collection device 1 and the terminal device (s) 50. In FIG. 2, for the convenience of explanation, a case is exemplified in which the collection system 100 includes the single terminal device 50; the collection system 100 may include the plurality of terminal devices 50.

First, the terminal device 50 will be explained. As illustrated in FIG. 2, the terminal device 50 is connected to a Global Positioning System (GPS) 60 that detects positional information on a vehicle and a camera 61 that captures the periphery of the vehicle.

Figures 3, 4:
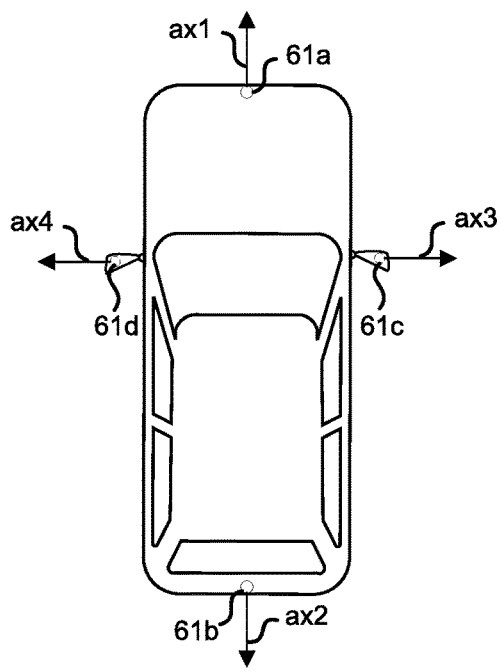
FIG. 3 is a diagram illustrating an arrangement example of cameras.
FIG. 4 is a diagram illustrating a specific example of vehicle information.

In the present embodiment, as the camera 61, the plurality of cameras 61 that captures the whole periphery of a vehicle may be used. FIG. 3 is a diagram illustrating a specific example of camera positions.

As illustrated in FIG. 3, the four cameras 61 are mounted on a vehicle. Specifically, with respect to a front-back direction of the vehicle, there are included a front camera 61a that includes an image-capturing axis ax1 arranged in the front of the vehicle so as to capture the front of the vehicle, and a rear camera 61b that includes an image-capturing axis ax2 arranged in the rear of the vehicle so as to capture the rear of the vehicle.

With respect to a left-right direction of the vehicle, there are included a right-side camera 61c that includes an image-capturing axis ax3 arranged in the right of the vehicle so as to capture the right of the vehicle, and a left-side camera 61d that includes an image-capturing axis ax4 arranged in the left of the vehicle so as to capture the left of the vehicle.

For example, each of the four cameras 61 includes a wide-angle lens such as a fisheye lens, and imaging data captured by the cameras 61 are connected with each other to obtain imaging data to be obtained by capturing the whole periphery of a vehicle. The camera positions illustrated in FIG. 3 are merely examples, and they are different depending on a vehicle.

Returning to FIG. 2, the explanation of the terminal device 50 will be continued. The terminal device 50 includes a communication unit 7, a control unit 8, and a storage 9. The communication unit 7 is a communication module that performs communication with the collection device 1, and operates by control of the control unit 8.

The control unit 8 includes an acquisition unit 81, a generation unit 82, a selection unit 83, and a transmitting unit 84. The control unit 8 includes a computer that includes, for example, a Central Processing Unit (CPU), a Read Only Memory (ROM), a Random Access Memory (RAM), a Hard Disk Drive (HDD), an input/output port, and the like; and various circuits.

The CPU of the computer reads out and executes a program stored in the ROM, for example, so as to function as the acquisition unit 81, the generation unit 82, the selection unit. 83, and the transmitting unit 84 of the control unit 8.

All or a part of the acquisition unit 81, the generation unit 82, the selection unit 83, and the transmitting unit 84 of the control unit 8 may be constituted of hardware such as an Application Specific Integrated Circuit (ASIC) and a Field Programmable Gate Array (FPGA).

The storage 9 corresponds to the RAM and/or the HDD, for example. The RAM and the HDD are capable of storing therein information on an imaging-data storing area 91, a collection-condition storing area 92, and various programs. The terminal device 50 may acquire the above-mentioned program and various kinds of information via another computer connected thereto by a wired or wireless network or a portable recording medium.

The acquisition unit 81 of the control unit 8 acquires a transmitting request for imaging data, which is transmitted from the collection device 1 on the basis of positional information of the vehicle C. When acquiring the transmitting request, the acquisition unit 81 stores the transmitting request in the collection-condition storing area 92 of the storage 9.

In the present embodiment, the transmitting request is transmitted by using broadcast communication in which the transmitting request is collectively transmitted to the plurality of terminal devices 50 or individual communication in which the transmitting request is individually transmitted to each of the terminal devices 50. For example, in the broadcast communication, positional information on the occurrence point P is transmitted, and in the individual communication, information on at least one of positional information of the occurrence point P and information on an image-capturing time point is transmitted. Positional information on the occurrence point P or information on an image-capturing time point is a selection condition of target data.

The acquisition unit 81 acquires imaging data captured by the camera 61, and stores the acquired imaging data in the imaging-data storing area 91 of a storage 9.

The generation unit 82 generates behavior information indicating a behavior of a vehicle on the basis of signals input from various sensors, and transmits the generated behavior information to the collection device 1 via the communication unit 7.

The behavior information includes, for example, vehicle-speed information input from a vehicle-speed sensor 51, steering-angle information input from a steering-angle sensor 52, brake information input from a brake sensor 53, airbag information input from an airbag sensor 54, and the like. The above-mentioned behavior information is merely one example, and other information may be included therein as long as the information indicates a behavior of a vehicle.

The selection unit 83 selects, from among imaging data stored in the storage 9, target data that is imaging data corresponding to a transmitting request acquired by the acquisition unit 81. Specifically, for example, the selection unit 83 selects as the target data, with reference to a transmitting request stored in the collection-condition storing area 92, imaging data captured at an image-capturing time point specified by the transmitting request.

In other words, the selection unit 83 selects only imaging data obtained by capturing the occurrence point P illustrated in FIG. 1, for example, and transmits the selected data to the transmitting unit 84. Thus, the transmitting unit 84 is capable of transmitting only the imaging data to the collection device 1, so that the collection device 1 is capable of reducing communication amount while collecting necessary imaging data.

When a transmitting request includes positional information on the occurrence point 9, the selection unit 83 may select, on the basis of the positional information, imaging data obtained by capturing the occurrence point P as target data.

As illustrated in FIG. 3, the vehicle C includes the plurality of cameras 61 having different capturing directions, namely, image-capturing axes ax. Thus, as described below, the selection unit 83 deals with a case where a transmitting request includes information that specifies the camera 61, in some cases. In this case, the selection unit 83 may select, as target data, imaging data of the specified camera 61.

When the vehicle C is going to pass through the occurrence point 9, the selection unit 83 may make a reservation to the camera 61 for capturing the occurrence point P. In other words, a transmitting request to be transmitted to a vehicle that is going to pass through the occurrence point 9 includes information that specifies a capturing condition of target data.

On the basis of the image-capturing request, the selection unit 83 makes a reservation to the camera 61 for capturing the occurrence point P. Imaging data corresponding to the image-capturing request is stored in the imaging-data storing area 91, and then the imaging data is selected as target data.

As described above, the selection unit 83 makes, in advance, a reservation to the camera 61 for capturing, so that it is possible to reliably collect desired imaging data. Moreover, for example, when the camera 61 is provided with a drive mechanism configured to drive the image-capturing axis ax, the selection unit 83 may set the drive mechanism in accordance with an image-capturing request. In other words, the camera 61 may be set to the desired image-capturing axis ax so as to capture imaging data.

The transmitting unit 84 transmits, to the collection device 1, target data selected by the selection unit 83. In other words, the transmitting unit 84 does not transmit all of imaging data, but transmits only target data including the occurrence point P. Thus, in the collection system 100 according to the embodiment, it is possible to reduce communication amount while collecting necessary imaging data.

Next, the collection device 1 will be explained. The collection device 1 includes a control unit 2, a storage 3, and a communication unit 10. The communication unit 10 is a communication module that communicates with the terminal device(s) 50, and operates by control of the control unit 2.

The control unit 2 includes a reception unit 21, a detection unit 22, a computing unit 23, and a transmitting unit 24. The control unit 2 includes a computer that includes, for example, a Central Processing Unit (CPU), a Read Only Memory (ROM), a Random Access Memory (RAM), a Hard Disk Drive (HDD), an input/output port, and the like; and various circuits.

The CPU of the computer reads out and executes a program stored in the ROM, for example, so as to function as the reception unit 21, the detection unit 22, the computing unit 23, and the transmitting unit 24 of the control unit 2.

All or a part of the reception unit 21, the detection unit 22, the computing unit 23, and the transmitting unit 24 of the control unit 2 may be constituted of hardware such as an Application Specific Integrated Circuit (ASIC) and a Field Programmable Gate Array (FPGA).

The storage 3 corresponds to the RAM and/or the HDD, for example. The RAM and the HDD are capable of storing therein information on vehicle information 31, an imaging-data database 32, and various programs. The collection device 1 may acquire the above-mentioned program and various kinds of information via another computer connected thereto by a wired or wireless network or a portable recording medium.

The vehicle information 31 stored in the storage 3 is information on each vehicle in which the corresponding terminal device 50 is provided. FIG. 4 is a diagram illustrating a specific example of the vehicle information 31. As illustrated in FIG. 4, the vehicle information 31 includes items of a vehicle ID, positional information, a camera position, and behavior information among other things.

The vehicle ID is an identifier for identifying a vehicle in which the terminal device 50 is provided. The positional information indicates a present location of a vehicle, and is updated at any time with the movement of the vehicle. As exemplified in FIG. 3, the camera position indicates a position of the camera 61 provided in a vehicle. The behavior information is information on a behavior of a vehicle, as described above.

Returning to FIG. 2, the reception unit 21 of the control unit 2 will be explained. The reception unit 21 receives information transmitted from the terminal device 50. The information includes positional information indicating a present location of a vehicle, behavior information indicating a behavior of the vehicle, and imaging data among other things. The reception unit 21 stores in the storage 3, as the vehicle information 31, positional information and behavior information of a vehicle, and further stores, in the imaging-data database 32, imaging data received from the terminal device 50.

The detection unit 22 detects an event that is based on a behavior of a vehicle. As described above, the event may be an accident, traffic jam, a sudden stop, and a sudden steering among other things. The detection unit 22 detects, for example, an operation signal of an airbag from behavior information so as to detect, as an event, an accident of a vehicle.

One example of a detection unit on the collection device 1 side is illustrated in FIG. 2, a detection unit may be provided on the terminal device 50 side, and an event, such as an accident detection and a vehicle traffic jam, may be properly selected in using the detection unit on the collection device. 1 side or the terminal device 50 side.

When detecting reduction by more than a predetermined value in a vehicle speed or change more than a predetermined value of a steering angle, the detection unit 22 detects, as an event, a sudden stop or sudden steering. Moreover, when a plurality of vehicles repeats travelling and stopping in line on the same road, the detection unit 22 detects traffic jam as an event. The detection unit 22 may detect an event, such as an accident of a vehicle and traffic jam, on the basis of accident information and/or traffic information separately transmitted from an external server.

When detecting an event, the detection unit 22 generates event information on a type of the detected event, positional information on the occurrence point P of the event, an occurrence time point of the event, and the like, and informs the computing unit. 23 of the generated event information. When the event is traffic jam, the occurrence point P is the head of the traffic jam.

The computing unit 23 selects, as a passing vehicle, a vehicle passed through the occurrence point P before and after an occurrence time point of an event, or a vehicle that is going to pass through the occurrence point P. In other words, a passing vehicle includes a following vehicle and an on-coming vehicle, when the occurrence point P is an intersection, a vehicle travelling toward the intersection is selected as a passing vehicle.

Figure 5:
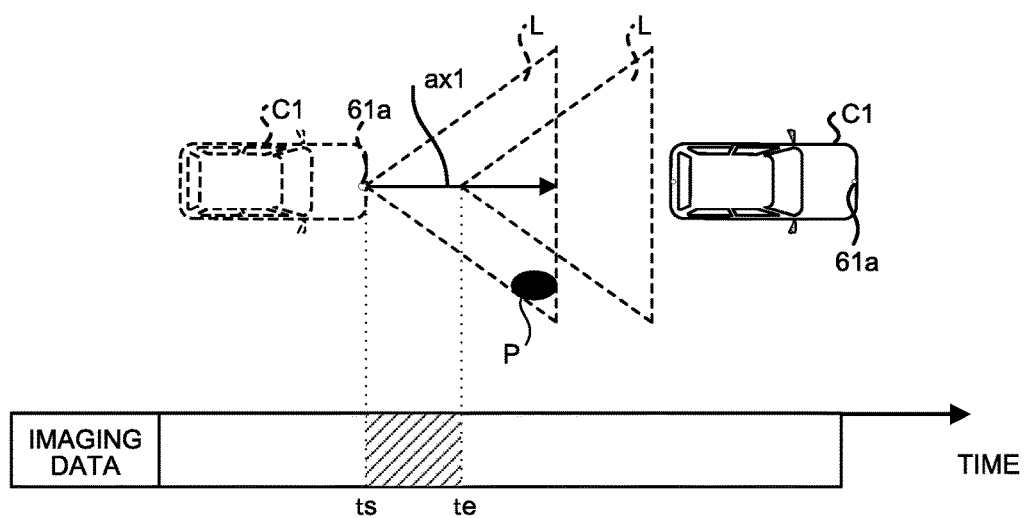
FIG. 5 is a diagram illustrating one example a process to be executed by a computing unit.

As described above, arrangement positions and the provided number of the cameras 61 of vehicles are different. FIG. 5 is a diagram illustrating one example a process to be executed by the computing unit 23. In FIG. 5, a case will be explained in which the vehicle C1 is provided with the front camera 61a. The image-capturing axis ax1 of the front camera 61a is an advancing direction of the vehicle C1, and has a predetermined image-capturing range L in a left-right direction with reference to the image-capturing axis ax1.

The computing unit 23 computes, on the basis of a positional relation between the vehicle C1 and the occurrence point P, an image-capturing time point at which the image-capturing range L includes the occurrence point P. Specifically, the computing unit 23 computes at any time, on the basis of a transition of a present location of the vehicle C1, an advancing direction of the vehicle C1 so as to compute a transition of the image-capturing range L.

The computing unit 23 computes an image-capturing time point at which the image-capturing range L includes the occurrence point P. In the example illustrated in FIG. 5, a case is exemplified in which the vehicle C1 is advancing straight, and the occurrence point P is included in imaging data at image-capturing time points between a start time point ts and an end time point te.

In other words, the computing unit 23 computes an image-capturing time point at which the image-capturing range L includes the occurrence point P, from a transition of a positional relation between the vehicle C1 and the occurrence point P. In this case, the computing unit 23 may compute an image-capturing time point on the basis of a transition of an advancing direction of the vehicle C1.

In other words, regarding the image-capturing axis ax1 and the image-capturing range L, when a steering angle of the vehicle C1 is changed, a direction of the image-capturing axis ax1 is changed in accordance with the change in the steering angle. Thus, the computing unit 23 is capable of correcting the image-capturing axis ax1 and the image-capturing range L in accordance with the steering angle so as to compute an image-capturing time point. In other words, the computing unit 23 computes an image-capturing time point in consideration of a steering angle of the vehicle C1, so that it is possible to precisely compute an image-capturing time point. The direction of a vehicle may be directly detected because there presents in some cases a case where a steering angle and a direction of the vehicle do not coincide with each other.

As described above, the provided cameras 61 are different depending on a vehicle. Particularly, when a vehicle includes the plurality of cameras 61 having the different image-capturing axes ax, an image-capturing time point at which the occurrence point P is able to be captured is different for each of the cameras 61.

Figure 6:
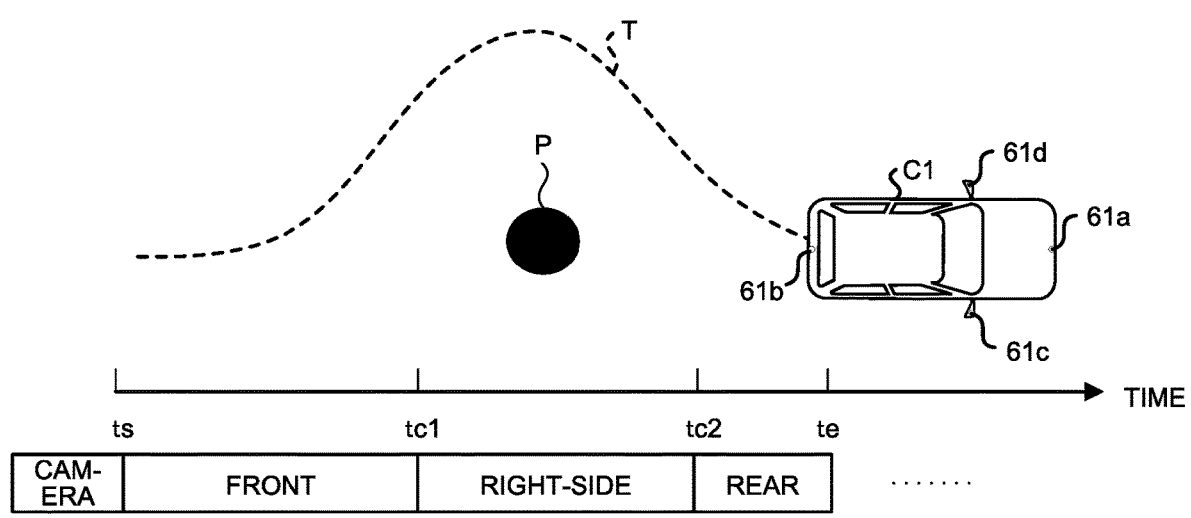
FIG. 6 is a diagram illustrating one example a process to be executed by the computing unit.

Thus, the computing unit 23 may compute an image-capturing time point for each of the cameras 61. FIG. 6 is a diagram illustrating a specific example of a process to be executed by the computing unit 23. A case will be explained in which the vehicle C1 is provided with the front camera 61a, the rear camera 61b, the right-side camera 61c, and the left-side camera 61d. As indicated by using a dashed line in FIG. 6, assume that the vehicle C1 travels along a travelling trajectory T that detours around the occurrence point P on the left side.

In the example illustrated in FIG. 6, the occurrence point P presents in front of the vehicle C1 during a time interval from the start time point is to a switching time point tc1, and thus the computing unit 23 estimates that the occurrence point P is included in imaging data of the front camera 61a during the time interval.

Next, the occurrence point P presents on the right side of the vehicle C1 during a time interval from the switching time point tc1 to a switching time point tc2, the computing unit 23 estimates that the occurrence point P is included in imaging data of the right-side camera 61c. In other words, at the switching time point tc1, a collection target of imaging data is switched from the front camera 61a into the right-side camera 61c.

Next, the occurrence point P presents in the rear of the vehicle C1 on and after the switching time point tc2, and thus the computing unit 23 estimates that the occurrence point P is included in imaging data of the rear camera 61b during a time interval from the switching time point tc2 to the end time point te.

As described above, the collection device 1 is capable of grasping information on an arrangement position of the camera 61 for each of the terminal devices 50 so as to compute an image-capturing time point for each of the cameras 61.

In other words, the collection device 1 according to the embodiment computes an image-capturing time point for each of the plurality of cameras 61 to be able to collect imaging data obtained by capturing the occurrence point P from various angles.

When transmitting a transmitting request by using broadcast communication, the computing unit 23 does not compute an image-capturing time point, but only selects a passing vehicle on the basis of positional information of the occurrence point P.

Returning to FIG. 2, the transmitting unit 24 will be explained. When the detection unit 22 has detected an event, the transmitting unit 24 transmits, to the terminal device 50 provided in a passing vehicle of the occurrence point P of the event, a transmitting request for imaging data obtained by capturing the occurrence point P.

The transmitting unit 24 transmits a transmitting request for imaging data to each of the terminal devices 50. The transmitting request according to the present embodiment includes information on an image-capturing time point computed by the computing unit 23.

In other words, the collection device 1 according to the present embodiment transmits, to each of the terminal devices 50, a transmitting request for imaging data including the occurrence point P, which is captured at an image-capturing time point. Thus, imaging data transmitted from each of the terminal devices 50 includes the occurrence point P.

When transmitting a transmitting request by using broadcast communication, the transmitting unit 24 transmits a transmitting request including positional information on the occurrence point P. In this case, the terminal device 50 computes an image-capturing time point at which the occurrence point. P is included in imaging data, and further transmits, as target data, imaging data captured at the image-capturing time point.

As described above, the collection device 1 receives target data alone, and thus imaging data substantially having no relation to an event is excepted from a collection target, so that it is possible to reduce communication amount while collecting necessary imaging data.

As illustrated in FIG. 6, the collection device 1 may transmit a transmitting request while specifying an image-capturing time point for each of the cameras 61. Thus, imaging data obtained by capturing the occurrence point P from various angles is able to be collected, so that it is possible to grasp an event more specifically.

For reducing communication amount in transmitting and receiving imaging data, the transmitting unit 24 may transmit a transmitting request for imaging data on a target region including the occurrence point P.

Figure 7:
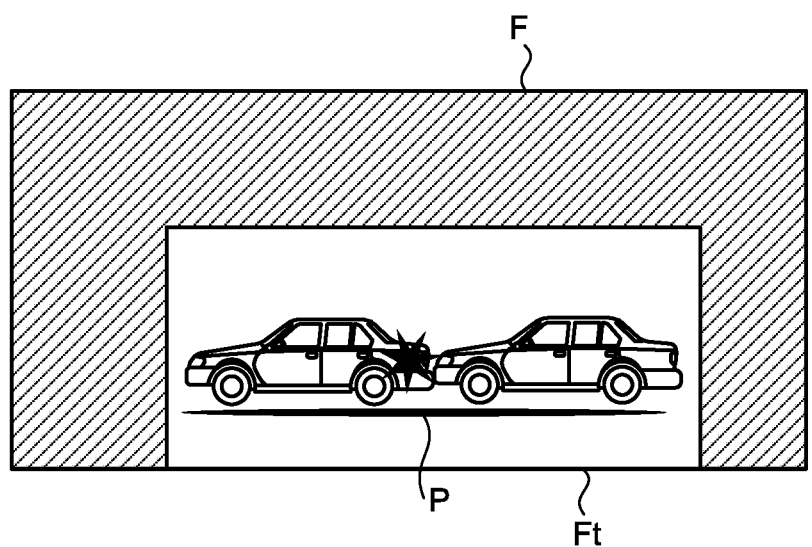
FIG. 7 is a diagram illustrating a specific example of a target region.

FIG. 7 is a diagram illustrating a specific example of a target region. As illustrated in FIG. 7, in imaging data F, a target region Ft is a region including the occurrence point P, and has a field angle of a predetermined range whose center is the occurrence point P, for example.

Hereinafter, a case will be explained in which the collection device 1 computes the target region Ft, and a transmitting request including the target region Ft is transmitted; however, the terminal device 50 may compute the target region Ft.

In the example illustrated in FIG. 7, a case is exemplified in which the occurrence point P is an accident scene, and the target region Ft includes a range alone in which vehicles collide with each other. In other words, the transmitting unit 24 transmits a transmitting request of the target region Ft, and thus the terminal device 50 transmits the target region Ft alone.

Thus, the terminal device 50 does not transmit imaging data other than the target region Ft, so that it is possible to reduce communication amount. Therefore, it is possible to reduce communication amount while collecting necessary imaging data.

A case is assumed where the number of passing vehicles of the occurrence point P is large or is contrary small. When the number of passing vehicles is large, imaging data are able to be collected from the plurality of passing vehicles, and thus there presents possibility that imaging data are excessively collected. Meanwhile, when the number of passing vehicles is small, there presents possibility that necessary imaging data is not able to be collected.

Thus, the transmitting unit 24 may specify, in accordance with the number of passing vehicles, the number of data of imaging data for each of the terminal devices 50 so as to transmit a transmitting request. Specifically, the transmitting unit 24 specifies the number of data in such a manner that the number of data of imaging data transmitted from the one terminal device 50 is smaller as the number of passing vehicles is larger, so as to transmit a transmitting request.

On the other hand, the transmitting unit 24 specifies the number of data in such a manner that the number of data of imaging data transmitted from the one terminal device 50 is larger as the number of passing vehicles is smaller, so as to transmit a transmitting request.

Thus, when the number of passing vehicles is large, imaging data is allocated to each of the passing vehicles and the allocated data is transmitted, and thus communication amount per passing vehicle is able to be reduced. When the number of passing vehicles is small, it is possible to reliably collect necessary imaging data.

Furthermore, an image-capturing time point is computed to be shorter as the traveling speed of a passing vehicle is higher. Thus, the transmitting unit 24 may specify the number of data in accordance with, in addition to the number of passing vehicles, the traveling speed of a passing vehicle so as to transmit a transmitting request.

In this case, an image-capturing time point is shorter as the traveling speed of a passing vehicle is higher, and thus the transmitting unit 24 transmits a transmitting request for all of imaging data including the occurrence point P.

On the other hand, an image-capturing time point is longer as the traveling speed of a passing vehicle is lower, and thus the transmitting unit 24 transmits a transmitting request for a part of imaging data. Thus, it is possible to reduce communication amount while collecting necessary imaging data.

Figure 8:
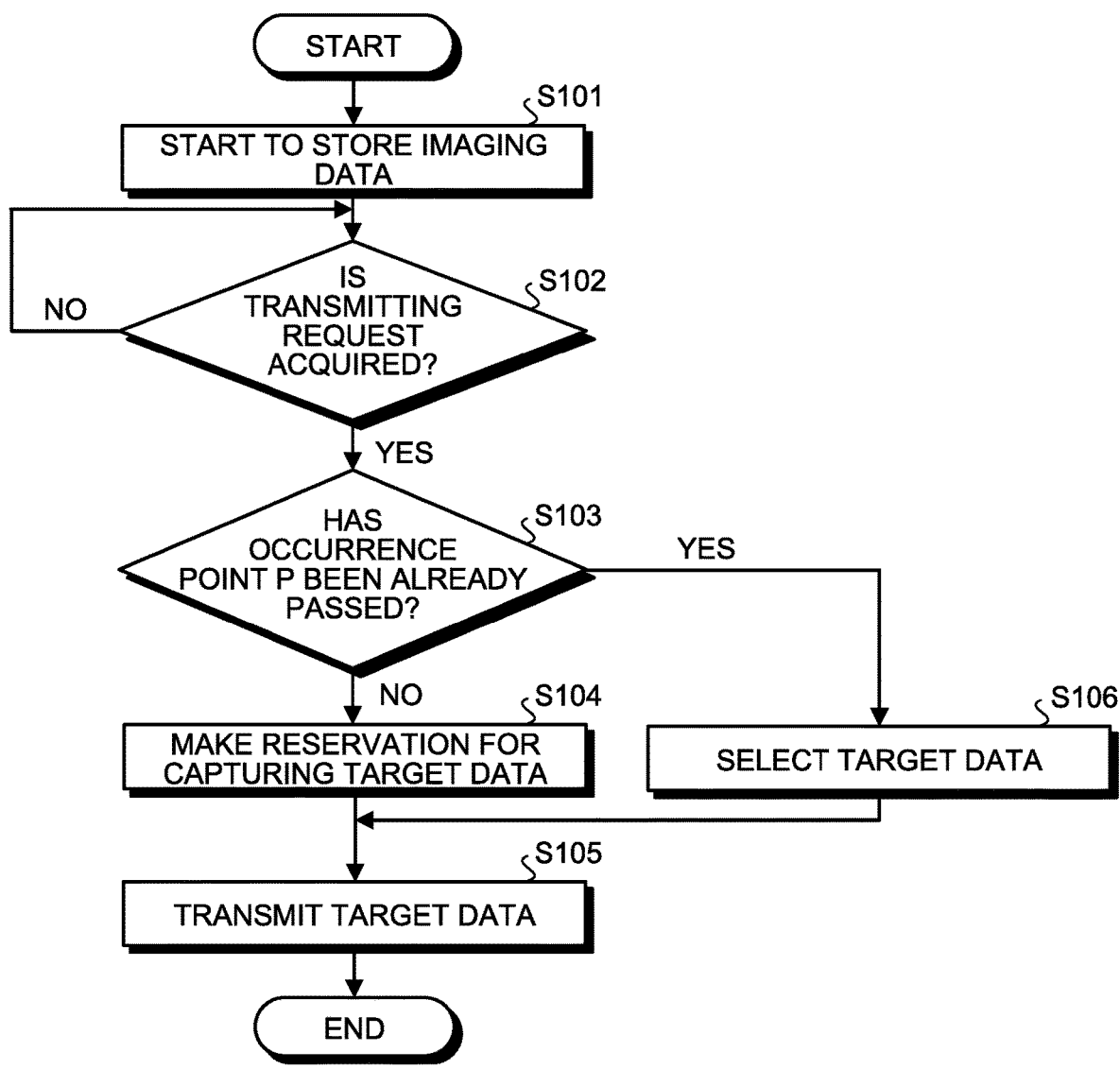
FIG. 8 is a flowchart illustrating a processing procedure to be executed by a terminal device.

Next, a processing procedure to be executed by the terminal, device 50 according to the embodiment will be explained with reference to FIG. 8. FIG. 8 is a flowchart illustrating a processing procedure to be executed by the terminal device 50.

As illustrated in FIG. 8, for example, when a power source of the terminal device 50 is turned ON, the acquisition unit 81 starts to store imaging data in the imaging-data storing area 91 of the storage 9 (Step S101).

Subsequently, the acquisition unit 81 determines whether or not having acquired a transmitting request for imaging data (Step S102), when having acquired a transmitting request (Step S102: Yes), the selection unit 83 determines whether or not the occurrence point P to be a collection target of imaging data has been already passed (Step S103).

When the occurrence point P has not been passed yet (Step S103: No), the selection unit 83 makes a reservation to the camera 61 for capturing target data, which is able to capture the occurrence point P (Step S104). When reserved target data is captured, the transmitting unit 84 transmits the target data (Step S105).

On the other hand, when a transmitting request has not been acquired (Step S102: No), the process of Step S102 is continuously executed. When the occurrence point P has been already passed (Step S103: Yes) the selection unit 83 selects target data from the imaging-data storing area 91 (Step S106), and s gifts the processing to a process of Step S105.

Next, a processing procedure to be executed by the collection device 1 according to the embodiment will be explained with reference to FIG. 9. FIG. 9 is a flowchart illustrating a processing procedure to be executed by the collection device 1.

As illustrated in FIG. 9, the reception unit 21 receives behavior information from each of the terminal devices 50 (Step S201). Subsequently, the detection unit 22 determines, on the basis of the behavior information, whether or not an event has occurred (Step S202).

When an event has occurred (Step S202: Yes), the computing unit 23 selects a passing vehicle on the basis of a transition of a positional relation between each of the terminal devices 50 and the occurrence point P (Step S203).

Subsequently, the computing unit 23 computes, for each of the terminal devices 50, an image-capturing time point at which the occurrence point P is able to be captured (Step S204). Next, the transmitting unit 24 transmits, to the terminal device 50 provided in a target vehicle, a transmitting request for imaging data including the occurrence point P (Step S205).

The reception unit 21 receives imaging data that is based on the transmitting request (Step S206), and ends the processing. On the other hand, when an event has not occurred in the process of Step S202 (Step S202: No), and the reception unit 21 continuously execute the process of Step S201.

When the transmitting request is transmitted by using broadcast communication, the collection device 1 transmits, to the plurality of terminal devices 50, positional information of the occurrence point P, and receives imaging data corresponding to the transmitting request.

As described above, the terminal device 50 according to the embodiment includes the storage 9, the acquisition unit 81, the selection unit 83, and the transmitting unit 84. The storage 9 stores therein imaging data captured from the vehicle C (one example of moving body). The acquisition unit 81 acquires a transmitting request for imaging data transmitted from the collection device 1 (one example of external device) on the basis of positional information of the vehicle C.

The selection unit 83 selects, from among the imaging data stored in the storage 9, target data that is imaging data corresponding to the transmitting request acquired by the acquisition unit 81. The transmitting unit 84 transmits the target data selected by the selection unit 83. Therefore, by employing the terminal device 50 according to the embodiment, it is possible to reduce communication amount while collecting necessary imaging data.

Note that, in the above-mentioned embodiment, the case has been explained in which the collection device 1 functions as a server device; however, the collection device 1 is needed to be a server device, and the collection device 1 may be integrated with each of the terminal devices 50. In other words, function of the collection device 1 may be dispersed into each of the terminal devices 50.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A terminal device comprising:
   a storage that stores therein imaging data captured by a plurality of cameras mounted on a moving body, the plurality of cameras having respective predetermined image-capturing ranges, and at least parts of the respective predetermined image-capturing ranges not overlapping with each other; and
   a processor operatively connected to the storage and configured to:
      acquire a transmitting request for imaging data transmitted from an external device, the transmitting request specifying an image-capturing time point or an image-capturing occurrence point of imaging data, the image-capturing time point corresponding to a time interval during which, as decided based on positional information of the moving body, the image-capturing occurrence point is included in at least one of the predetermined image-capturing ranges; and
      select, from among the imaging data stored in the storage, target data that is imaging data corresponding to the acquired transmitting request, the target data being imaging data of at least one of the plurality of cameras whose image-capturing range includes the image-capturing occurrence point; and
      transmit the selected target data to the external device so that only the imaging data of the at least one camera whose image-capturing range includes the image-capturing occurrence point is transmitted to the external device.

2. The terminal device according to claim 1, wherein the transmitting request includes specifying information of a camera of the plurality of cameras, and
the processor is configured to select, as the target data, imaging data of the camera that is decided based on the specifying information in the transmitting request.

3. The terminal device according to claim 1, wherein the processor is configured to make a reservation for capturing the target data corresponding to the transmitting request.

4. A collection method comprising:
   storing imaging data captured by a plurality of cameras mounted on a moving body, the plurality of cameras having respective predetermined image-capturing ranges, and at least parts of the respective predetermined image-capturing ranges not overlapping with each other;
   acquiring a transmitting request for imaging data transmitted from an external device, the transmitting request specifying an image-capturing time point or an image-capturing occurrence point of imaging data, the image-capturing time point corresponding to a time interval during which, as decided based on positional information of the moving body, the image-capturing occurrence point is included in at least one of the predetermined image-capturing ranges;
   selecting, from among the imaging data stored in the storing, target data that is imaging data corresponding to the acquired transmitting request, the target data being imaging data of at least one of the plurality of cameras whose image-capturing range includes the image-capturing occurrence point; and
   transmitting the selected target data to the external device so that only the imaging data of the at least one camera whose image-capturing range includes the image-capturing occurrence point is transmitted to the external device.

* * * * *